United States Patent [19]

Fling

[11] Patent Number: 4,738,511
[45] Date of Patent: Apr. 19, 1988

[54] MOLECULAR BONDED FIBER OPTIC COUPLERS AND METHOD OF FABRICATION

[75] Inventor: John J. Fling, Malibu, Calif.

[73] Assignee: Litton Systems, Inc., Beverly Hills, Calif.

[21] Appl. No.: 816,882

[22] Filed: Jan. 7, 1986

[51] Int. Cl.⁴ .......................... G02F 2/02; G02B 6/26
[52] U.S. Cl. .......................... 350/96.15; 350/96.10; 350/96.29; 350/96.20
[58] Field of Search ................ 350/96.15, 96.20, 96.29

[56] References Cited

U.S. PATENT DOCUMENTS

| | | | |
|---|---|---|---|
| 4,054,366 | 10/1977 | Barnoski et al. | 350/96.15 |
| 4,315,666 | 2/1982 | Hicks, Jr. | 350/96.15 |
| 4,325,636 | 4/1982 | Schiffner | 356/350 |
| 4,387,954 | 6/1983 | Beasley | 350/96.15 |
| 4,398,794 | 8/1983 | Palmer et al. | 350/96.19 |
| 4,444,458 | 4/1984 | Stowe et al. | 350/96.20 X |
| 4,461,536 | 7/1984 | Shaw et al. | 350/96.15 |
| 4,462,699 | 7/1984 | Shaw et al. | 374/131 |
| 4,550,974 | 11/1985 | Murphy | 350/96.15 |
| 4,553,811 | 11/1985 | Becker et al. | 350/96.20 |
| 4,553,814 | 11/1985 | Bahl et al. | 350/96.21 |
| 4,556,279 | 12/1985 | Shaw et al. | 350/96.15 |
| 4,557,553 | 12/1985 | McLandrich | 350/96.15 |
| 4,564,262 | 1/1986 | Shaw | 350/96.15 |
| 4,564,417 | 1/1986 | Schoen et al. | 156/633 |
| 4,569,569 | 2/1986 | Stewart | 350/96.19 |
| 4,575,180 | 3/1986 | Chang | 350/96.15 |
| 4,586,783 | 5/1986 | Campbell et al. | 350/96.15 |
| 4,586,784 | 5/1986 | Tremblay et al. | 350/96.15 |
| 4,588,256 | 5/1986 | Onstott et al. | 350/96.21 |
| 4,589,725 | 5/1986 | Dyott | 350/96.15 |
| 4,591,237 | 5/1986 | Laude | 350/96.15 |
| 4,591,372 | 5/1986 | Bricheno et al. | 65/4.2 |
| 4,593,988 | 6/1986 | Giallorenzi | 350/96.15 |
| 4,595,839 | 6/1986 | Braun et al. | 250/551 |
| 4,601,535 | 7/1986 | Tanaka et al. | 350/96.20 |
| 4,601,541 | 7/1986 | Shaw et al. | 350/96.15 X |
| 4,688,882 | 8/1987 | Failes | 350/96.15 |
| 4,707,201 | 11/1987 | Failes | 156/64 |

FOREIGN PATENT DOCUMENTS

| | | |
|---|---|---|
| 0038023A2 | 4/1980 | European Pat. Off. |
| 52-14430 | 3/1977 | Japan . |
| 53-91752 | 11/1978 | Japan . |
| 54-101334 | 9/1979 | Japan . |

OTHER PUBLICATIONS

R. A. Bergh, M. J. F. Digonnet, H. C. Lefevre, S. A. Newton, and H. J. Shaw Single Mode Fiber Optic Components.

Kapany, et al., "Coherent Interactions Between Optical Waveguides and Lasers", Journal of the Optical Society of America, 1968, vol. 58, No. 9, p. 1176+.

Primary Examiner—William L. Sikes
Assistant Examiner—Akm E. Ullah
Attorney, Agent, or Firm—John H. Lynn

[57] ABSTRACT

A fiber optic coupler is formed by heating juxtaposed optically flat surfaces formed on two lengths of optical fiber to the glass transition temperature. The fibers bond together while preserving the molecular composition of the fibers at bonded region. Depending upon the depth to which the fibers are lapped to form the optically flat surfaces, the coupler may be either an evanescent field coupler or a core intercept coupler. The fibers may be mounted on curved substrates and then lapped to form the optically flat surfaces. The optical throughput of a fiber may be monitored during assembly of a coupler to permit adjustment of the positions of the optically flat surfaces to produce a desired coupling efficiency. The fibers may then be bonded together by application of energy from a suitable coherent light source such as a $CO_2$ laser.

13 Claims, 2 Drawing Sheets

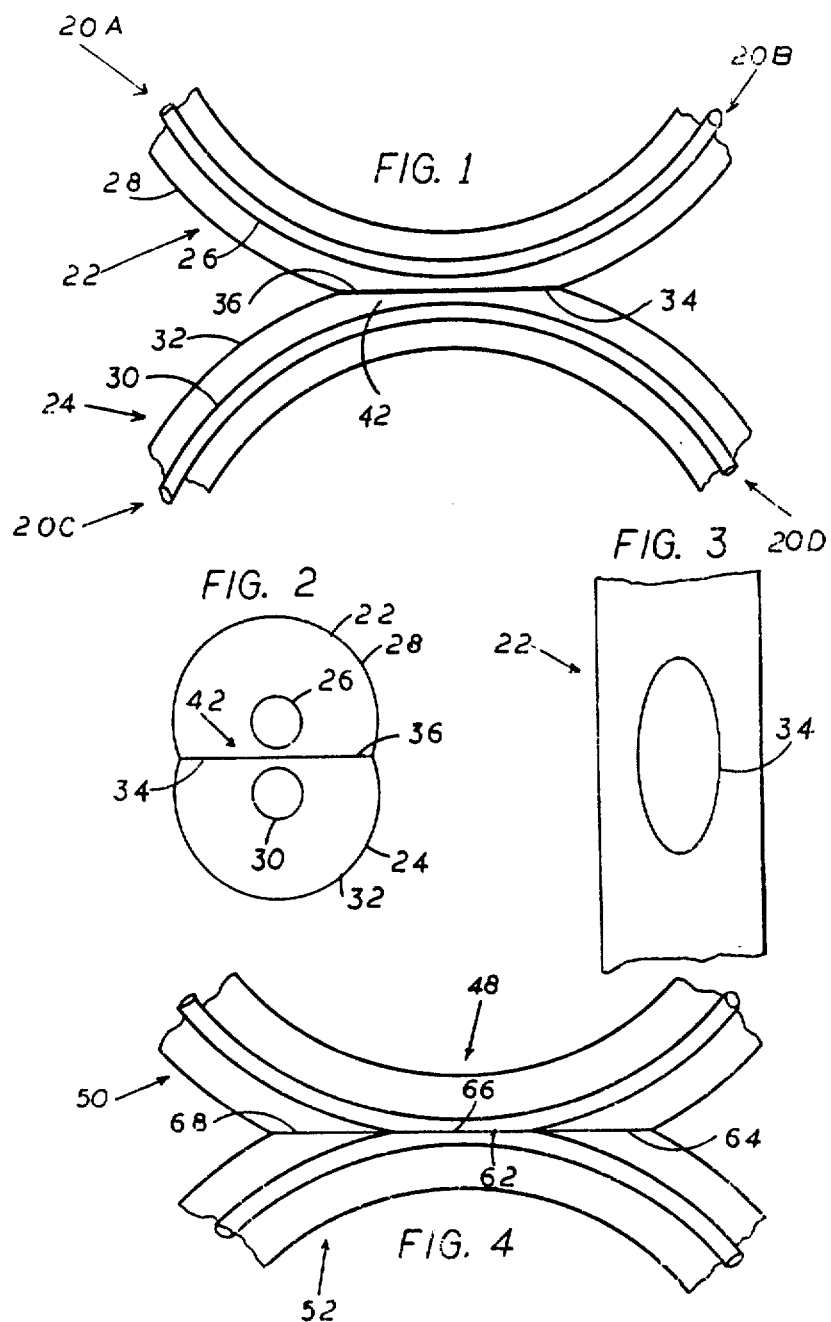

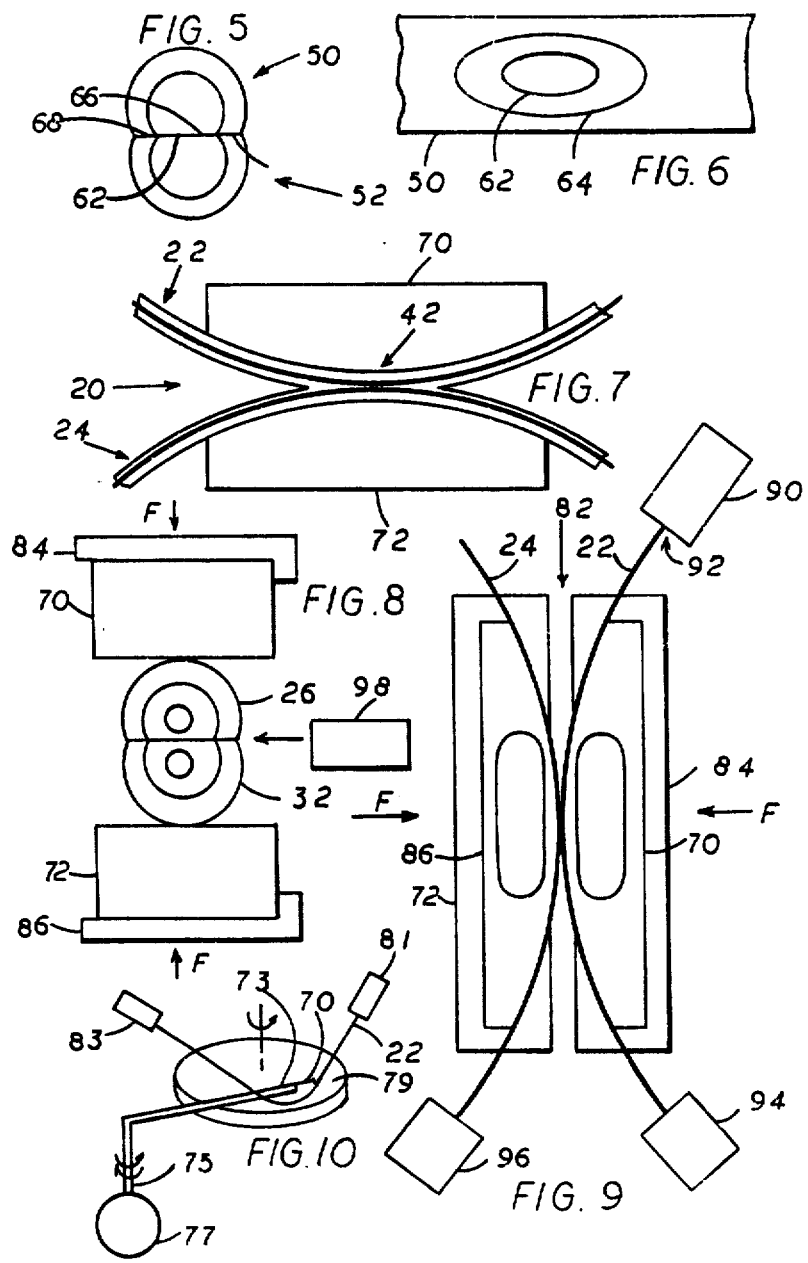

MOLECULAR BONDED FIBER OPTIC COUPLERS AND METHOD OF FABRICATION

BACKGROUND OF THE INVENTION

This invention relates generally to methods and apparatus for bonding optical fibers together. More particularly, this invention relates to methods and apparatus for forming fiber optic couplers. Still more particularly, this invention relates to methods and apparatus for forming a coherent molecular bond between two optical fibers.

Some familiarity with the propagation characteristics of light within an optical fiber will facilitate an understanding of both the present invention and the prior art. Therefore, a brief discussion of fiber optic waveguides, normal modes of propagation of light in such waveguides and polarization of light is presented.

The behavior of an optical wave at an interface between two dielectric materials depends upon the refractive indices of the two materials. If the refractive indices of the two dielectrics are identical, then the wave propagates across the interface without experiencing any change. In the general case of different refractive indices, however, there will be a reflected wave, which remains in the medium in which the wave was first propagating, and a refracted wave, which propagates beyond the dielectric interface into the second material with a change in direction relative to the incident wave. The relative intensities of the reflected and refracted waves depend upon the angle of incidence and the difference between the refractive indices of the two materials. If an optical wave originally propagating in the higher index material strikes the interface at an angle of incidence greater than or equal to a critical angle, there will be no refracted wave propagated across the interface; and essentially all of the wave will be totally internally reflected back into the high index region. An exponentially decaying evanescent wave associated with the incident wave extends a small distance beyond the interface.

Optical fiber has an elongated generally cylindrical core of higher refractive index and a cladding of lower refractive index surrounding the core. Optical fiber use the principle of total internal reflection to confine the energy associated with an optical wave to the core. The diameter of the core is so small that a light beam propagating in the core strikes the core only at angles greater than the critical angle. Therefore, a light beam follows an essentially zig-zag path in the core as it moves between points on the core-cladding interface.

It is well-known that a light wave may be represented by a time-varying electromagnetic field comprising orthogonal electric and magnetic field vectors having a frequency equal to the frequency of the light wave. An electromagnetic wave propagating through a guiding structure can be described by a set of normal modes. The normal modes are the permissible distributions of the electric and magnetic fields within the guiding structure, for example, a fiber optic waveguide. The field distributions are directly related to the distribution of energy within the structure. The normal modes are generally represented by mathematical functions that describe the field components in the wave in terms of the frequency and spatial distribution in the guiding structure. The specific functions that describe the normal modes of a waveguide depend upon the geometry of the waveguide. For an optical fiber, where the guided wave is confined to a structure havinf a circular cross section of fixed dimensions, only fields having certain frequencies and spatial distributions will propagate without severe attenuation. The waves having field components that propagate unattenuated are the normal modes. A single mode fiber will guide only one energy distribution, and a multimode fiber will simultaneously guide a plurality of energy distributions. The primary characteristic that determines the number of modes a fiber will guide is the ratio of the diameter of the fiber core to the wavelength of the light propagated by the fiber.

In describing the normal modes, it is convenient to refer to the direction of the electric and magnetic fields relative to the direction of propagation of the wave. If only the electric field vector is perpendicular to the direction of propagation, which is usually called the optic axis, then the wave is said to be a transverse electric (TE) mode. If only the magnetic field vector is perpendicular to to the optic axis, the wave is a transverse magnetic (TM) mode. If both the electric and magnetic field vectors are perpendicular to the optic axis, then the wave is a transverse electromagnetic (TEM) mode. None of the normal modes require a definite direction of the field components: and in a TE mode, for example, the electric field may be in any direction that is perpendicular to the optic axis.

The direction of the electric field vector in an electromagnetic wave is the polarization of the wave. In general, a wave will have random polarization in which there is a uniform distribution of electric field vectors pointing in all directions permissible for each mode. If all the electric field vectors in a wave point in only one particular direction, the wave is linearly polarized. If the electric field consists of two orthogonal electric field components of equal magnitude and 45° out of phase, the electric field is circularly polarized because the net electric field is then a vector that rotates around the optic axis at an angular velocity equal to the frequency of the wave. If the two linear polarizations have unequal magnitudes and phases that are neither equal nor opposite, the wave has elliptical polarization. In general, any arbitray polarization can be represented by either the sum of two orthogonal linear polarizations, two oppositely directed circular polarizations or two oppositely directed elliptical polarizations having orthogonal semi-major axes.

Propagation characteristics such as velocity, for example, of an optical wave depend upon the polarization of the wave and the index of refraction of the medium through which the light propagates. Certain materials, including optical fiber, have different refractive indices for different polarizations. A material that has two refractive indices is said to be birefringent.

The polarization of an optical signal is sometimes referred to as a mode. A standard single mode optical fiber will propagate two waves of the same frequency and spatial distribution that have two different polarizations. A multimode fiber will propagate two polarizations for each propagation mode. Two different polarization components of the same normal mode can propagate through a birefringent material unchanged except for a difference in velocity of the two polarizations. Polarization is particularly important in interferometric sensors because only waves having the same polarization will produce the desired interference patterns.

An optical coupler joins two fibers for transmitting optical energy from one fiber to the other. Optical couplers are used in many applications of optical fiber, including constructing fiber optic interferometers, resonators, sensor arrays and data buses.

Among the parameters that are considered in forming an optical coupler are the polarizations of the waves before and after coupling, the fraction of energy to be coupled from one fiber to the other, the insertion loss of the coupler and whether the fibers guide only a single mode or a multiplicity of modes.

Several methods have been employed for joining two fibers to form a coupler for transmitting optical energy from one fiber to the other. A first technique for joining two fibers results in the biconical tapered fiber optic coupler. The fibers are placed together, twisted and then heated to near the melting point to fuse them during application of a force to stretch the fibers. The heating and twisting steps in the formation of the biconical tapered fiber optic coupler result in alteration of the molecular arrangements of the materials comprising the joined fibers. In particular, the heating and twisting alters the distributions of impurities used as dopants to control the refractive indices of the core.

The refractive index of a material depends upon its molecular structure; therefore, forming the biconical tapered fiber optic coupler, in general, produces localized changes in the refractive indices of the fibers. These changes in refractive indices are uncontrollable and cause undesirable, uncontrollable reflections and refraction at the interfaces between the fibers. It is therefore difficult to fabricate biconical tapered fiber optic coupler having coupling efficiencies predetermined for specific applications.

Another technique for joining two fibers includes grinding flat surfaces on facing portions of the fibers and joining them by mechanically fixing the surfaces in juxtaposition with a refractive index matching oil or other material that enhances light transmission between the fibers.

These and other prior methods of forming fiber optic couplers have the disadvantage of suffering undesirably high loss of optical signal intensity. These prior fabrication techniques generally fail to facilitate control of the amount of light transmitted by any particular coupler and also fail to permit control of the amount of light that will be coupled from one fiber to another. Such problems are caused by the inherent intermolecular inhomogeneities and discontinuities that occur at the interfaces during prior fabrication processes for joining fibers. Further, prior fabrication techniques are not conducive to producing the great numbers of optical couplers required in communications, data processing and sensor applications.

Many applications of fiber optic couplers require very low signal loss in the coupler and also require couplers having critically selected light transmission and coupling characteristics. Large numbers of such couplers are required for practical applications of optical fibers.

SUMMARY OF THE INVENTION

The present invention provides a method and apparatus for forming fiber optic couplers that avoid the inherent problems of couplers fabricated according to previous techniques. In the present invention bonding of a pair of optical fibers occurs at the molecular level in a critical fashion such that the molecular structure of the glass is coherently homogeneous and uniform across the bonded surfaces, thereby preserving the physical characteristics of light transmission across the coupling junction and avoiding unnecessary loss of signal intensity.

The present invention permits precise control of the amount of light coupled between fibers and is suitable for mass production of optical couplers having precisely selected coupling and transmission characteristics.

The present invention provides a fiber optic coupler for coupling an optical wave between a pair of optical fibers each having a central core surrounded by a cladding, the cores and claddings having characteristic refractive indices, comprising a first planar surface formed on a first optical fiber by removing at least a portion of the cladding therefrom and a second planar surface formed on a second optical fiber by removing at least a portion of the cladding therefrom, the first and second planar surfaces being juxtaposed to form an interaction region wherein light is to propagate between the fibers. A coherent molecular bond is formed between the first and second planar surfaces without altering the core and cladding refractive indices across the joined surfaces.

In one embodiment of the invention, the planar surfaces are formed by removing portions of the cladding from curved lengths of the optical fibers such that evanescent field coupling at the interaction region between optical waves guided by a first one of the fibers and the other fiber couples energy between the fibers.

In another embodiment of the invention the planar surfaces are formed by removing portions of the cladding and a portions of the core from curved lengths of the optical fibers such that juxtaposing the fiber cores forms an intercepting core coupler.

The present invention includes a fiber optic coupler for coupling an optical wave between a pair of optical fibers each having a central core surrounded by a cladding, the cores and claddings having characteristic refractive indices. The coupler according to the invention is formed by the process comprising forming a first planar surface formed on a first optical fiber by removing at least a portion of the cladding therefrom and forming a second planar surface on a second optical fiber by removing at least a portion of the cladding therefrom, the first and second planar surfaces being juxtaposed to form an interaction region wherein light propagates between the fibers; and forming a coherent molecular intermolecular bond formed between the first and second planar surfaces without altering the local core and cladding refractive indices.

The coherent molecular bond that joins the fibers to form the coupler may be formed by the process comprising aligning the planar surfaces relative to one another to provide a predetermined coupling efficiency; and applying a controlled amount of energy to the planar surfaces to cause them to bond together, forming a homogeneous, coherent intermolecularly bonded structure.

The method of the present invention for forming a fiber optic coupler for coupling an optical wave between a pair of optical fibers each having a central core surrounded by a cladding, the cores and claddings having characteristic refractive indices, comprises the steps of: forming a first planar surface formed on a first optical fiber by removing at least a portion of the cladding therefrom; forming a second planar surface formed on a second optical fiber by removing at least a portion of the cladding therefrom, the first and second planar surfaces being juxtaposed to form an interaction region wherein light propagates between the fibers: and forming a coherent molecular bond between the first and second planar surfaces without altering the local core and cladding refractive indices by causing intermolecular inhomogeneities and discontinuities across the joined surfaces.

The step of forming the coherent molecular bond may comprise the steps of aligning the planar surfaces relative to one another to provide a predetermined coupling efficiency; and applying a controlled amount of energy to the planar surfaces to cause them to bond together, thereby forming a homogeneous, coherent intermolecularly bonded structure.

The step of applying energy to the planar surfaces may include focusing a beam of coherent light thereon. The step of forming a coherent molecular bond may include heating the fibers to a transition temperature below the melting temperature of the fibers.

BRIEF DESCRIPTION OF THE DRAWINGS

FIG. 1 is a cross sectional view of a fiber optic evanescent field coupler formed according to the present invention;

FIG. 2 is a cross sectional view of the fiber optic evanescent field coupler taken along line 2—2 of FIG. 1;

FIG. 3 is a plan view showing an oval surface on a portion of an optical fiber included in the fiber optic evanescent field coupler of FIGS. 1 and 2;

FIG. 4 is a cross sectional view of an intercepting core coupler formed according to the present invention;

FIG. 5 is a cross sectional view taken along line 5—5 of FIG. 4;

FIG. 6 is a plan view showing core and cladding planar surfaces on a portion of an optical fiber included in the fiber optic intercepting core coupler of FIGS. 4 and 5;

FIG. 7 is a plan view illustrates a system for joining two optical fibers to form either an evanescent field fiber optic coupler as shown in FIGS. 1-3 or an intercepting field coupler as shown in FIGS. 4-6;

FIG. 8 is an cross sectional view showing alignment of a pair of optical fibers with a jig and application of energy thereto for bonding the fibers together to form a fiber optic coupler;

FIG. 9 is a plan view of the apparatus of FIG. 8; and

FIG. 10 illustrates formation of an optically flat surface on an optical fiber to be used in forming a fiber optic coupler.

DESCRIPTION OF THE PREFERRED EMBODIMENT

Evanescent Field Coupler

As illustrated in FIG. 1, a coupler 20 formed according to the method of the invention includes a pair of optical fibers 22 and 24 mounted together. The fiber 22 has a core 26 and a cladding 28, and the fiber 24 has a core 30 and a cladding 32. As explained subsequently, an oval shaped optically flat surface 34 is formed in the cladding 28 of the fiber 22. Similarly, an oval shaped optically flat surface 36 is formed in the cladding 32 of the fiber 24.

The oval surfaces 34 and 36 are juxtaposed in facing relationship to form an interaction region 42 wherein the evanescent fields of light propagated by each of the fibers 22 and 24 interact with the other fiber. The quality and quantity of light crossing or interacting across the juxtaposed surfaces 34 and 36 are affected by discontinuities, inhomogeneities and other local defects caused in the interaction region by the manner of joining and the type of bond produced between the surfaces 34 and 36. The essence of the present invention is a coupler and method of fabrication thereof that comprises a bonded surface that is molecularly coherent, homogeneous and continuous across and around the joined surfaces 34 and 36 of the fibers 22 and 24. Accordingly, local irregularities in the refractive indices are avoided, with the resultant interaction region 42 of the joined region having well behaved refractive indices throughout as expected for a molecularly consistent material.

The amount of fiber optic material removed increases gradually from zero at the edges of the oval-shaped planar surfaces 34 and 36 to a maximum amount at the centers thereof. The tapered removal of fiber optic material enables the fibers 22 and 24 to converge and diverge gradually, which is advantageous for avoiding backward reflection and excessive loss of light energy at the interaction region 42. The gradual curvature of the fibers 22 and 24 prevents sharp bends or other abrupt changes in direction of the fibers 22 and 24 to avoid power loss through mode perturbation.

Light is transferred between the fibers 22 and 24 by evanescent field coupling at the interaction region 42. The core 26 has a refractive index that is greater than that of the cladding 28, and the diameter of the core 26 is such that light propagating within the core 26 internally reflects at the core-cladding interface. Most of the optical energy guided by the optical fiber 22 is confined to its core 26. However, solution of the wave equations for the fiber 22 and applying the well-known boundary conditions shows that the energy distribution, although primarily in the core 26, includes a portion that extends into the cladding and decays exponentially as the radius from the center of the fiber increases. The exponentially decaying portion of the energy distribution within the fiber 22 is generally called the evanescent field. If the evanescent field of the optical energy initially propagated by the fiber 22 extends a sufficient distance into the fiber 24, energy will couple from the fiber 22 into the fiber 24.

It has been found that to ensure proper evanescent field coupling, the amount of material removed from the fibers 22 and 24 must be carefully controlled so that the spacing between the cores of the fibers 22 and 24 is within a predetermined critical zone. The evanescent field extends a short distance into the cladding and decreases rapidly in magnitude with distance outside the fiber core. Thus, sufficient fiber optic material should be removed to permit overlap between the evanescent fields of waves propagated by the two fibers 22 and 24. If too little material is removed, the cores will not be sufficiently close to permit the evanescent fields to cause the desired interaction of the guided waves; and therefore, insufficient coupling will result.

Conversely, removal of too much material alters the propagation characteristics of the fibers, resulting in loss of light energy from the fibers due to mode perturbation. However, when the spacing between the cores of the fibers 22 and 24 is within the critical zone, each fiber 22 and 24 receives a significant portion of the evanescent field energy from the other to achieve good coupling without significant energy loss. The critical zone includes the region in which the evanescent fields of the fibers 22 and 24 overlap sufficiently to provide good evanescent field coupling with each core being within the evanescent field of light guided by the other core. It is believed that for weakly guided modes, such as the $HE_{11}$ mode guided by single mode fibers, mode perturbation occurs when the fiber core is exposed. Therefore, the critical zone is the core spacing that causes the evanescent fields to overlap sufficiently to cause coupling without causing substantial mode perturbation induced power loss.

The extent of the critical zone for a particular coupler depends upon a number of factors, such as the physical parameters of the fibers and the geometry of the coupler. The critical zone also is affected by the type of bond formed between the joined fibers. The critical zone may be quite narrow for a single mode fiber having a step index profile. The center-to-center spacing of the fibers 22 and 24 is typically less that two to three core diameters.

The fibers 22 and 24 preferably have substantially identical core and cladding diameters, the same radius of curvature at the interaction zone 42, and the same amount of fiber optic material removed therefrom to form the interaction region 42. The fibers 22 and 24 are symmetrical through the interaction region 42 in the planes of the surfaces 34 and 36, respectively, so that the facing planar oval surfaces of the fibers 22 and 24 are coextensive when they are superimposed. The two fibers 22 and 24 therefore have identical propagation characteristics at the interaction region, thereby avoiding reduction in coupling that is associated with dissimilar propagation characteristics. Each of the optical fibers 22 and 24 has a propagation constant that determines the parameters, such as wavelength, reflection at interfaces and attenuation of waves propagating therein. It is well-known that energy couples between media having substantially identical propagation constants more easily than between media having different propagation constants. Therefore, in forming the coupler 20, it is desirable to minimize variations of the propagation constant at the interaction region 42.

The coupler 20 of FIGS. 1 and 4 includes four ports labeled 20A, 20B, 20C and 20D. Ports 20A and 20B, which are on the left and right sides, respectively, of the coupler 20 correspond to the fiber 22. The ports 20C and 20D, which are on the left and right sides, respectively, of the coupler 20 correspond to the fiber 24. For purposes of explanation it is assumed that an optical signal input is applied to port 20A through the fiber 22. The signal passes through the coupler 20 and is output at either one or both of ports 20B or 20C depending upon the amount of coupling between the fibers 22 and 24. The "coupling constant" is defined as the ratio of the coupled power to the total output power.

In the above example, the coupling constant is the ratio of the power output at port 20D divided by the sum of the power output at the ports 20B and 20D. This ratio is sometimes called the "coupling efficiency", which is typically expressed as a percent. Therefore, when the term "coupling constant" is used herein, it should be understood that the corresponding coupling efficiency is equal to the coupling constant times 100.

The coupler 20 may be tuned to adjust the coupling constant to any desired value between zero and 1.0 by offsetting the confronting surfaces 34 and 36 to control the dimensions of the region of overlap of the evanescent fields of waves guided by the fibers 22 and 24. Tuning may be accomplished by sliding the surfaces 34 and 36 laterally or longitudinally relative to one another during assembly of the coupler 20.

The coupler 20 is highly directional with substantially all of the power applied at one side thereof being output at the ports on the other side. Substantially all of the light applied as an input to either ports 20A or 20C is delivered to ports 20B and 20D without appreciable contra-directional coupling. The directional characteristic is symmetrical in that light applied to either ports 20C or 20D is delivered to ports 20A and 20B. The coupler 20 is essentially non-discriminatory with respect to polarizations and preserves the polarization of light input thereto.

Light that is cross-coupled from one of the fibers 22 and 24 to the other undergoes a phase shift of $\pi/2$, but light that passes straight through the coupler 20 without being cross-coupled is not shifted in phase. For example, if the coupler 20 has a coupling constant of 0.5, and an optical signal is input to port 20A, then the outputs at ports 20B and 20D will be equal magnitude; but the output at port 20D will be shifted in phase by $\pi/2$ relative to the output at port 20B.

The coupler 20 is a low loss device, having typical insertion losses of about 0.1% to 0.2%. The term "insertion loss" as used herein refers to the real scattering losses of light energy passing through the coupler 20. For example, if light energy is input to port 20A; and the light energy output at ports 20B and 20D totals 97% of the input energy, the insertion loss is 3%. The term "coupler transmission" is defined as one minus the insertion loss and is typically expressed an a decimal fraction.

Intercepting Core Coupler

Referring to FIG. 4, an intercepting core fiber optic coupler 48 formed according to the methods of the present invention includes a pair of optical fibers 50 and 52.

The fiber 50 is polished to remove sufficient fiber optic material to expose a core portion 62 and a cladding portion 64 on the fiber 50. Similarly, the fiber 52 is polished to remove sufficient fiber optic material to expose a core portion 66 and a cladding portion 68 on the fiber 52. The fibers 50 and 52 preferably have identical dimeters, and the core and cladding portions 62 and 64 have dimensions substantially identical to the core and cladding portions 66 and 68, respectively. The dimensions of the core portion 62 the cladding portion 64 are determined by the diameters of the core and cladding of the fiber 50 and the depth to which fiber optic material is removed therefrom. Similarly, the dimensions of the core portion 66 the cladding portion 68 are determined by the diameters of the core and cladding of the fiber 52 and the depth to which fiber optic material is removed therefrom.

The exposed core portions 62 and 66 and the cladding portions 64 and 68 are juxtaposed in facing relationship. The fibers 50 and 52 are then bonded together as described subsequently herein. The coupling efficiency of the coupler 48 is determined primarily by the depths to which material is removed from the cores of the fibers 50 and 52 and the relative positions of the flat regions thereon when the fibers are bonded together.

If the fibers 50 and 52 have different diameters, then they will ordinarily be polished to different depths so that the exposed core and cladding portions, respectively, will have essentially the same dimensions. If the fiber 50 has a smaller core diameter than the fiber 52, the coupling efficiency of the coupler 48 depends on which fiber carries the optical wave to the region where the cores intercept. The coupling efficiency will in general be higher when the light is incident upon the coupler 48 from within the fiber having the smaller diameter.

Method of Farbication

The ensuing description of the processes for fabricating the couplers 20 and 48 begins with a description of the steps used for fabricating the evanescent field coupler 20. Many identical steps are involved in fabricating the evanescent field coupler 20 and the intercepting core coupler 48. The process for fabricating the intercepting core coupler 48 will point out the similarities and differences between the fabrication methods.

The first step in formation of the coupler 20 is to remove any jacketing material that may be on a length of a few centimeters of the fibers to provide access to the bare cladding thereof. Referring to FIGS. 7 and 8, the fibers 22 and 24 are then attached to convexly curved surfaces of a pair of substrates 70 and 72, respectively, by the use of any suitable adhesive. The substrates 70 and 72 may be made of any generally rigid material, such as glass, metal or plastic. The radii of curvature of the substrates 70 and 72 preferably are identical and are sufficiently large to preclude the risk of fracturing the fibers as they are bent to conform to the curvature.

The central portions of the fibers 22 and 24 may then be lapped using conventional lapping methods to a predetermined depth to remove cladding material therefrom and form the planar surfaces 34 and 36, respectively. The planar surfaces 34 and 36 should be sufficiently flat that they tend to adhere to one another when they are placed together with no adhesive or index matching oil therebetween.

A lapping technique that has been found to be advantageous in forming the planar surface 34 and 36 to be optically flat is illustrated in FIG. 10. The fiber 22 is shown mounted to the substrate 70, which is connected to a retainer 73 by any suitable means, such as clamping or gluing. The retainer 73 is supported on a shaft 75 that extends from a motor 77, which controls the elevation of the shaft 77 and retainer 75 relative to an optically flat lapping surface 79. The lapping begins with the central portion of the convexly curved fiber 22 being tangent to the lapping surface 79. As the lapping proceeds, the motor 77 lowers the shaft 75, the retainer 73 and the substrate 70 with the fiber 22 attached thereto such that the planar surface 34 is formed by lapping radially inward from the point of initial contact between the fiber 22 and the lapping surface 79.

A preferred method for determining the depth to which the fiber is lapped is to apply an optical signal to one end thereof from a laser 81 and to monitor the optical output at the other end with a photodetector 83. A lapping slurry having a refractive index near that of the fiber 22 is maintained on the lapping surface 79 during the lapping process. As the lapping proceeds, light couples from the fiber 22 into the lapping slurry, thereby reducing the optical throughput of the fiber 22. The optical throughput may be correlated to the lapping depth. In general, the relation between the optical throughput and lapping depth depends upon the specfic type of fiber being lapped. Therefore, it is necessary to perform a series of measurements of the lapping depth as a function of optical throughput to produce a calibration curve for the particular fiber being lapped and the lapping slurry used therewith.

As explained previously, care must be taken to avoid removal of too much cladding material from the fibers used to form the evanescent field coupler 20. Using ordinary single mode fiber, forming the coupler 20 to have a coupling efficiency of one to two percent requires removal of about ten percent of the core depth at the center of the oval surfaces.

After the fibers 22 and 24 are mounted on the corresponding substrates 70 and 72 and the oval surfaces are formed using, for example, the methods described above, the planar surfaces 34 and 36 in juxtaposition as shown in FIGS. 7-9. A preferred method for holding the surfaces 34 and 36 in the desired positions is to place the substrates 70 and 72 are placed in a jig 82 as shown in FIG. 9. The jig 82 includes a pair of retainers 84 and 86 for holding the substrates 70 and 72, respectively, so that they are movable with respect to one another. The substrates 70 and 72 are placed in desired positions relative to one another and then the fibers 22 and 24 are bonded together. Ordinarily, the fibers 22 and 24 will be positioned to maximize the coupling of optical signals therebetween.

The coupler 20 may be formed to have a desired coupling constant. One preferred method for assuring achievement of a desired coupling constant includes the step of inputting an optical signal from a laser 90 into an end 92 of the fiber 22. The intensities of the optical signals emanating from the fibers 22 and 24 after the input beam has impinged upon the interaction region 42 are monitored using suitable photodetectors 94 and 96, respectively, while the substrates are manipulated to achieve a desired coupling efficiency. The amount of coupling may be varied by moving the substrates 70 and 72 in the jig 82 to adjust the amount of overlap of the planar surfaces 34 and 36. The coupling efficiency is $$\eta = 1 - l_t/l_i$$
$$= l_c(l_t + l_c)^{-1},$$

where $\eta$ is the coupling efficiency, $l_i$ is the light intensity input to fiber 22, $l_t$ is the light transmitted through fiber 22 beyond the interaction region 42 and $l_c$ is the light intensity coupled from fiber 22 to fiber 24.

After the fibers 22 and 24 have been positioned to provide the desired coupling constant, energy is applied to the interface of the planar surfaces 34 and 36. As shown in FIG. 8, the energy source may be a laser 98. The laser 98 is preferably a $CO_2$ laser, and it should produce an output beam that will heat the fibers 22 and 24 to a temperature near the glass transition temperature. The energy source may also be an ultrasonic wave generator, an induction heating source or other suitable device for providing the desired amount of heat to the fibers 22 and 24. As shown in FIGS. 8 and 9, a force F may be applied to compress the fibers 22 and 24 together during the bonding process. Generally it has been found that a compressive force of about a pound facilitates formation of the coherent molecular bond The transition temperature is below the melting point of the glass from which the fibers 22 and 24 are formed. The transition temperature depends upon the materials comprising the fibers 22 and 24. Most optical fiber is formed from silicon dioxide with a dopant such as germanium dioxide or boron added thereto to control the refractive index. Such fibers typically have transition temperatures in the range of 1100° C. to 1200° C. The transition temperature should be determined experimentally for the fibers to be joined, and the energy output from the laser 98 should be controlled to assure that the temperature in the bonded region does not exceed the transition temperature. The transition temperature of an optical fiber is attained when the fiber begins to soften as the temperature increases.

Applying the output of the laser 98 over the juncture of the surfaces 34 and 36 fuses the fibers 22 and 24 together. It has been found that the above described method forms a junction of the surfaces 34 and 36 that results in a coherent molecular bonded region having the same physical structure and the same optical characteristics as the bulk material comprising fibers 22 and 24.

The processes of forming and joining optically flat surfaces on fiber 22 and 24 described herein provide a fiber optic coupler having a bonded surface that is molecularly coherent, homogeneous and continuous across and around the joined surfaces 34 and 36 of the fibers 22 and 24. Accordingly, local irregularities in the refractive indices are avoided, with the resultant interaction region 46 of the joined region having well behaved refractive indices throughout as expected for a molecularly consistent material. The step of coupling light from the fibers 22 and 24 while they are lapped to form the optically flat surfaces 34 and 36, respectively, permits sufficient control of the lapping depth fabrication to form the coupler 20 to have a predetermined coupling efficiency.

The primary difference between the steps for fabricating the evanescent field coupler 20 and the intercepting core coupler 48 is the depth to which the fibers 22, 24, 50 and 52 are lapped. The amount of coupling depends upon the length of the interaction zone, which is a function of the lapping depth and the radius of curvature of the fiber being lapped. It has been found that in general a 3 dB intercepting core coupler should have the fibers lapped to remove 50% of the core to provide full modal mixing. It is well known from electromagnetic theory that the energy distributions of the normal modes varies with the radial distance from the center of an optical fiber. The energy in the lower order modes tends to be primarily in the central region of the core, whereas the higher order modes tend to have more energy near the core/cladding interface. Since most of the energy in a multimode fiber is in the lower order modes, good coupling is facilitated by having the central regions of the cores in contact.

Couplers formed according to the above described method have been cut into sections and examined with high power microscopes and a mireau interferometer. These instruments show that the bond interface has no distortion of the molecular arrangements of the cores or the claddings of the fibers and that the molecular structure of the interface is identical to that of the fibers.

What is claimed is:

1. A fiber optic coupler for coupling an optical wave between a pair of optical fibers each having a central core surrounded by a cladding, the cores and claddings having characteristic refractive indices, comprising:
a first planar surface formed on a first optical fiber by removing at least a portion of the cladding therefrom;
a second planar surface formed on a second optical fiber by removing at least a portion of the cladding therefrom, said first and second planar surfaces being juxtaposed to form an interaction region wherein light propagates between the fibers; and
said first and second planar surfaces being joined by a molecular bond.

2. The fiber optic coupler of claim 1 wherein said coherent molecular bond is formed without altering the characteristic core and cladding refractive indices at the interaction region.

3. The fiber optic coupler of claim 2 wherein the planar surfaces are formed by removing only portions of the cladding from curved lengths of the optical fibers such that evanescent field coupling at the interaction region between optical waves guided by a first one of the fibers and the other fiber couples energy between the fibers.

4. The fiber optic coupler of claim 2 wherein the planar surfaces are formed by removing portions of the cladding and a portions of the core from curved lengths of the optical fibers such that juxtaposing the fiber cores forms an intercepting core coupler.

5. The fiber optic coupler of claim 2 wherein the interaction region is formed to provide a predetermined coupling efficiency.

6. The fiber optic coupler of claim 1 wherein said coherent molecular bond is formed by lapping the first and second planar surfaces to be optically flat and bonding them together by application of a controlled amount of energy thereto.

7. The fiber optic coupler of claim 6 wherein a compressive force is applied to said first and second fibers to apply pressure between said first and second planar surfaces as they are bonded together.

8. A method for forming a fiber optic coupler for coupling an optical wave between a pair of optical fibers each having a central core surrounded by a cladding, the cores and claddings having characteristic refractive indices, comprising the steps of:
forming a first planar surface formed on a first optical fiber by removing at least a portion of the cladding therefrom;
forming a second planar surface formed on a second optical fiber by removing at least a portion of the cladding therefrom, said first and second planar surfaces being juxtaposed to form an interaction region wherein light propagates between the fibers; and
forming a coherent molecular bond formed between the first and second planar surfaces.

9. The method of claim 8 wherein the step of forming the coherent molecular bond comprises the steps of:
aligning the planar surfaces relative to one another to provide a predetermined coupling efficiency; and
applying energy to the planar surfaces to bond them together.

10. The method of claim 9 wherein the step of aligning the planar surfaces includes the steps of:
introducing an optical beam into a first end of one of the fibers on one side of the interaction region; and
monitoring the optical energy output from an end of at least one of the fibers on the other side of the interaction region.

11. The method of claim 9 wherein the step of applying energy to the planar surfaces includes focusing a beam of coherent light thereon.

12. The method of claim 8 wherein forming a coherent molecular bond includes heating the fibers to a transition temperature below the melting temperature of the fibers.

13. The method of claim 8, further including the step of applying a compressive force is to the first and second fibers to apply pressure between the first and second planar surfaces as they are bonded together.

* * * * *

UNITED STATES PATENT AND TRADEMARK OFFICE
Certificate

Patent No. 4,738,511

Patented: Apr. 19, 1988

On petition requesting issuance of a certificate for correction of inventorship pursuant to 35 U.S.C. 256, it has been found that the above-irentified patent, through error and without any decptive intent, improperly sets forth the inventorship. Accordingly, it is hererby certified that the correct inventorship of this patent is:

John J. Fling, Michael D. Bramson, Thomas E. O'Mara and Loren F. Stokes.

Signed and Sealed this Eighth Day of January, 1991.

*Supervisory Patent Examiner*
*Group Art Unit 251*